(12) United States Patent
Lilburn (10) Patent No.: US 9,182,482 B2
(45) Date of Patent: Nov. 10, 2015

(54) RADAR BEAM SHARPENING SYSTEM AND METHOD

(71) Applicant: Navico Holding AS, Lysaker (NO)

(72) Inventor: Lindsay Lilburn, Auckland (NZ)

(73) Assignee: Navico Holding AS, Lysaker (NO)

( * ) Notice: Subject to any disclaimer, the term of this patent is extended or adjusted under 35 U.S.C. 154(b) by 247 days.

(21) Appl. No.: 13/660,599

(22) Filed: Oct. 25, 2012

(65) Prior Publication Data

US 2013/0307720 A1    Nov. 21, 2013

(30) Foreign Application Priority Data

Oct. 25, 2011   (NZ) .......................................... 595954

(51) Int. Cl.
| | |
|---|---|
| *G01S 13/93* | (2006.01) |
| *G01S 13/90* | (2006.01) |
| *G01S 7/04* | (2006.01) |
| *G01S 7/12* | (2006.01) |
| *G01S 13/42* | (2006.01) |

(52) U.S. Cl.
CPC .............. *G01S 13/9035* (2013.01); *G01S 7/046* (2013.01); *G01S 7/12* (2013.01); *G01S 13/42* (2013.01)

(58) Field of Classification Search
CPC ..................... G01S 13/9035; G01S 2013/9047; G01S 13/42; G01S 7/046; G01S 7/12
USPC .................. 342/25 R–25 F, 41, 175
See application file for complete search history.

(56) References Cited

U.S. PATENT DOCUMENTS

| | | | |
|---|---|---|---|
| 4,243,988 A | | 1/1981 | Kang et al. |
| 4,978,961 A | * | 12/1990 | Williams et al. ............ 342/25 C |
| 5,003,313 A | | 3/1991 | Doriath |
| 5,831,570 A | * | 11/1998 | Ammar et al. .............. 342/26 B |
| 6,542,110 B1 | * | 4/2003 | Lohner et al. ............... 342/25 R |
| 7,106,250 B2 | | 9/2006 | Blunt et al. |
| 7,236,125 B2 | * | 6/2007 | Tullsson ....................... 342/173 |
| 2006/0060761 A1 | * | 3/2006 | Williams ...................... 250/221 |
| 2009/0121920 A1 | * | 5/2009 | Mullarkey et al. ........... 342/175 |
| 2010/0302088 A1 | * | 12/2010 | Winstead et al. ............. 342/120 |
| 2012/0169531 A1 | * | 7/2012 | Bunch ......................... 342/25 R |

FOREIGN PATENT DOCUMENTS

GB          2449171 A       11/2008

OTHER PUBLICATIONS

Kwange Hee Kim; Sook Gyeong Kim; Jae Woong Yi, "Detection of ship targets near coastline by using Doppler Beam Sharpening technique," Synthetic Aperture Radar (APSAR), 2011 3rd International Asia-Pacific Conference on , vol., No., pp. 1,4, Sep. 26-30, 2011.*

* cited by examiner

*Primary Examiner* — John B Sotomayor
*Assistant Examiner* — Marcus Windrich
(74) *Attorney, Agent, or Firm* — Frommer Lawrence & Haug LLP (57) ABSTRACT

A radar beam sharpening system for processing a radar video stream of echo return intensities, sampled in range and azimuth. The system uses a signal processor that is configured to apply beam sharpening to the radar video stream and which selectively varies the level of beam sharpening applied as a function of range and/or a land map generated from the radar video stream so as to generate an output selectively beam sharpened radar video stream.

25 Claims, 8 Drawing Sheets

RADAR BEAM SHARPENING SYSTEM AND METHOD

FIELD OF THE INVENTION

The invention relates to a radar beam sharpening system and method. In particular, although not exclusively, the system and method of beam sharpening is applied to marine radar systems.

BACKGROUND TO THE INVENTION

At a general level, marine radar systems typically comprise a rotating radar antenna scanner that transmits electromagnetic pulses during rotational 360° sweeps (scans) at a number azimuthal directions in the sweep, determined by an azimuthal sampling rate. For each pulse in an azimuthal direction the echo return signal is received and sampled at a number of ranges from the scanner. The resultant digital radar video stream generated by the scanner is then typically signal processed to detect targets for presenting on a radar display, such as a Plan Position Indicator (PPI).

In recent years it has become practical to improve the azimuth resolution of radar using signal processing techniques commonly referred to as 'beam sharpening'. Beam sharpening in the context of this specification is considered to be any process that significantly improves target discrimination in azimuth.

Figure 1:
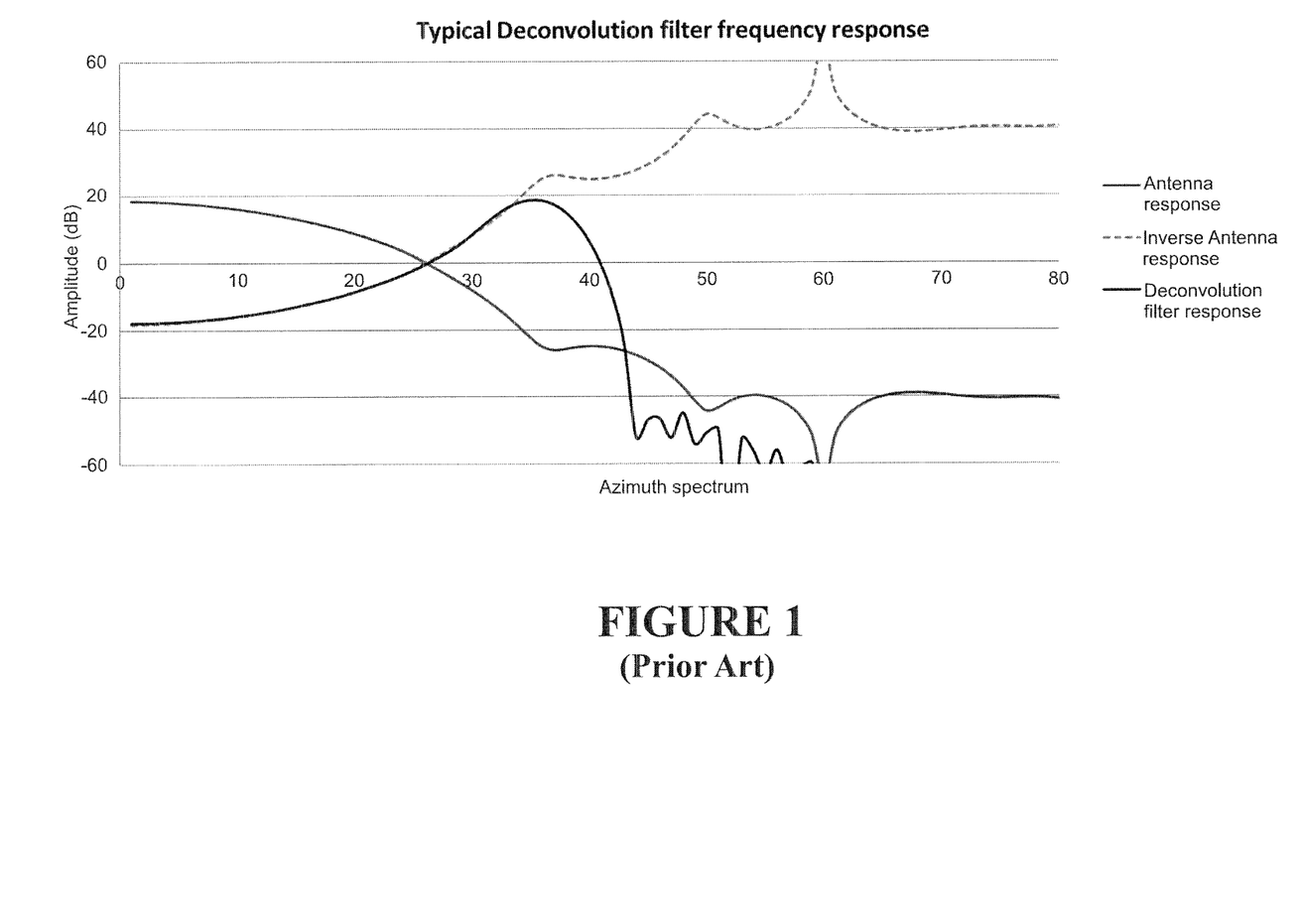
FIG. 1 is a plot of the typical deconvolution filter frequency response for beam sharpening.

One well-known beam sharpening method is to use deconvolution. In radar, the rotating antenna sweeps over targets and mathematically this can be described as the convolution of the target pattern and the antenna pattern. The resulting signal is then deconvolved to recover the original target pattern. The deconvolution process may be described in the azimuth spectral domain as applying a filter with an inverse frequency response to the antenna. In theory the original target pattern can be perfectly recovered. However, in practice the multi-element antennas typically used for radar applications have a low pass response with zeros in the stopband. The inverse response therefore has points of infinite gain that cannot be implemented. In practice, the inverse response must be modified in some manner. Typically the inverse antenna response is limited to a practical level of maximum gain through the use of an appropriate low pass filter, and an example of a possible filter response relative to the associate antenna and inverse antenna response is shown in FIG. 1.

GB2449171 discloses one form of deconvolution-based beam sharpening which involves iteratively carrying out the steps of filtering the incoming signal and then clipping values of the filtered signal which are below a baseline level, for example.

Beam sharpening has the advantage of better discriminating targets in azimuth and is very beneficial to navigation and collision avoidance in general but does have downsides in the following respects:
i) Detail is increased everywhere in the radar image so it can be more difficult to interpret for novice users and in rough sea conditions on small craft. This includes areas where detail does not add much value such as within extensive land targets.
ii) Targets at close range can become difficult to see on the display because of the geometric compression a PPI display inherently causes.
iii) Frequency Modulated Continuous Wave (FMCW) radars are capable of detecting targets down to a range of several meters. At such ranges a much greater proportion of targets become azimuth extensive. A complex target, such as a sailboat, at these ranges may produce multiple discriminated returns. In this case discriminating features within the target is of no navigational value.
iv) A PPI produces inherent visual distortion of the radar image, being highly compressed in azimuth at close range progressing to being highly expanded at long range. For radars with wide azimuth beamwidth such as radomes, this causes increased error between the chart and radar image when overlaid.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the invention to provide an improved radar beam sharpening system method which at least goes some way to addressing some of the above disadvantages of beam sharpening, or which at least provides the public with a useful choice.

SUMMARY OF THE INVENTION

In a first aspect, the invention broadly consists in a radar beam sharpening system for processing a radar video stream of echo return intensities, sampled in range and azimuth, comprising: a signal processor configured to apply beam sharpening to the radar video steam and to selectively vary the level of beam sharpening applied based on range so as to generate an output range-dependent beam sharpened radar video stream.

In one form, the signal processor is configured to selectively suppress the level of beam sharpening applied relative to a maximum limit of suppression based on the range of the sample of radar video stream being processed. In one form, the signal processor is configured to apply a higher level of beam sharpening suppression at shorter ranges relative to longer ranges. The level of suppression applied to each sample in the radar video stream may vary from full suppression such that no beam sharpening is present in the output radar video stream, to nil suppression in which full beam sharpening is present in the output radar video stream.

In one form, the level of beam sharpening applied is azimuth independent.

In one form, the signal processor comprises: a beam sharpener that is configured to receive and process the original radar video stream and generate a beam sharpened radar video stream; and a mixer configured to blend the original radar video stream with the beam sharpened radar video stream based on a variable mixing ratio that is a function of range of the sample of the radar video steam being processed so as to generate the output range-dependent beam sharpened radar video stream.

In one form, the mixing ratio defines the proportions of each of the original radar video stream and beam sharpened radar video stream present in the output range-dependent beam sharpened radar video stream.

In one form, the mixer comprises: a mixer control function that is configured to determine the range of the sample of the original radar video stream being processed and to generate the variable mixing ratio based on that range; a first multiplier configured to receive the original radar video stream and multiply that stream by the mixing ratio to generate a first multiplier output stream; a second multiplier configured to receive the beam sharpened radar video stream and multiply that stream by the inverse of the mixing ratio to generate a second multiplier output stream; and an adder that is configured to combine the first and second output streams from the multipliers to generate the output range-dependent beam sharpened radar video stream.

In one form, the mixer control function is configured to generate a mixing ratio that varies with range such that the proportion of the beam sharpened radar video stream in the output range-dependent beam sharpened radar video stream is reduced for short ranges relative to longer ranges.

In one form, the mixing ratio is variable between a first maximum limit representing full beam sharpening suppression applied in which the output range-dependent beam sharpened radar video stream comprises only the original radar video stream and a minimum limit representing nil beam sharpening suppression in which the output range-dependent beam sharpened radar video stream comprises only the beam sharpened radar video stream.

In a second aspect, the invention broadly consists in a method of beam sharpening a radar video stream of echo return intensities, sampled in range and azimuth, comprising: receiving the radar video stream; applying a selectively variable level of beam sharpening to the radar video stream based on range; and outputting a range-dependent beam sharpened radar video stream.

In one form, applying a selectively variable level of beam sharpening to the radar video stream comprises selectively suppressing the level of beam sharpening applied relative to a maximum limit of suppression based on the range of the sample of radar video stream being processed. In one form, the method comprises applying a higher level of beam sharpening suppression at shorter ranges relative to longer ranges.

In one form, applying a selectively variable level of beam sharpening to the radar video stream based on range comprises: beam sharpening the original radar video stream to generate a beam sharpened radar video stream; determining the range of the current sample of the radar video stream being processed; determining a variable mixing ratio for blending the original radar video stream with the beam sharpened radar video stream, the variable mixing ratio being a function of the range of the current sample being processed; and mixing the original radar video stream with the beam sharpened radar video stream according to the mixing ratio to generate the output range-dependent beam sharpened radar video stream.

In one form, the mixing ratio defines the proportion of each of the beam sharpened radar video stream and original radar video stream present in the output range-dependent beam sharpened radar video stream.

In one form, mixing the original radar video stream with the beam sharpened radar video stream based on the mixing ratio comprises: multiplying the original radar video stream by the mixing ratio to generate a first output stream; multiplying the beam sharpened radar video stream by the inverse of the mixing ratio to generate a second output stream; and combining the first and second output streams to generate the output range-dependent beam sharpened radar video stream.

In one form, determining the variable mixing ratio comprises generating the mixing ratio based on a mixing control function. In one form, the mixer control function generates a mixing ratio that varies with range such that the proportion of the beam sharpened radar video stream in the output range-dependent beam sharpened radar video stream is reduced for short ranges relative to longer ranges.

In one form, the mixing ratio is variable between a first maximum limit representing full beam sharpening suppression applied in which the output range-dependent beam sharpened radar video stream comprises only the original radar video stream and a minimum limit representing nil beam sharpening suppression in which the output range-dependent beam sharpened radar video stream comprises only the beam sharpened radar video stream.

The second aspect of the invention may further have any one or more features mentioned in respect of the first aspect of the invention, and vice versa.

In a third aspect, the invention broadly consists in a radar beam sharpening system for processing a radar video stream of echo return intensities, sampled in range and azimuth, comprising: a signal processor configured to apply beam sharpening to the radar video stream and to selectively vary the beam sharpening applied based on a land map generated from the radar video stream so as to generate an output land map dependent beam sharpened radar video stream.

In one form, the signal processor is configured to selectively suppress the level of beam sharpening applied relative to a maximum limit based on the land map data associated with the sample of radar video steam being processed. In one form, the signal processor is configured to apply a higher level of beam sharpening suppression to samples corresponding to land-type targets relative to non-land-type targets as determined from the land map data.

The level of suppression applied to each sample in the radar video stream may vary from full suppression such that no beam sharpening is present in the output radar video stream, to nil suppression in which full beam sharpening is present in the output radar video stream. In one form, the signal processor is configured to apply nil suppression to samples corresponding to non-land-type targets, and a level of suppression to samples corresponding to land-type targets that increases with the intensity of the land-type targets based on the land map.

In one form, the signal processor comprises: a beam sharpener that is configured to receive the original radar video stream and generate a beam sharpened radar video stream; and a mixer configured to blend the original radar video steam with the beam sharpened radar video stream based on a variable mixing ratio that is a function of the land map generated from the original radar video stream so as to generate the output land map dependent beam sharpened radar video stream.

In one form, the mixing ratio defines the proportions of each of the original radar video stream and beam sharpened radar video stream present in the output land map dependent beam sharpened radar video stream.

In one form, the mixer comprises: a mixer control function that is configured to generate land map data for the sample of the original radar video stream being processed and to generate the variable mixing ratio based on that land map data; a first multiplier configured to receive the original radar video stream and multiply that stream by the mixing ratio to generate a first multiplier output stream; a second multiplier configured to receive the beam sharpened radar video stream and multiply that stream by the inverse of the mixing ratio to generate a second multiplier output stream; and an adder configured to combine the first and second output streams from the multipliers to generate the output land map dependent beam sharpened radar video stream.

In one form, the mixing control function is configured to generate a mixing ratio that varies with the land map such that the proportion of the beam sharpened radar video stream in the output land map dependent radar video stream is reduced for samples of the radar video stream corresponding to land-type targets relative to non-land-type targets.

In one form, the mixing ratio is variable between a first maximum limit representing MI beam sharpening suppression applied in which the output land map dependent beam sharpened radar video stream comprises only the original radar video stream and a minimum limit representing nil beam sharpening suppression in which the output land map dependent beam sharpened radar video stream comprises only the beam sharpened radar video stream.

In one form, the mixer control function comprises land map generator that is configured to generate land map data from the original radar video stream. In one form, the land map generator comprises a land map filter that is configured to low pass filter the original radar video stream in range and azimuth to generate a land map filtered radar video stream and the mixing ratio is dependent on the land map filtered radar video stream.

In one form, the land map generator of the mixer control function further comprises a land sensitivity time control (STC) function following the land map filter that is configured to apply STC processing to the land map filtered radar video stream based on an STC threshold profile that defines an echo return intensity threshold over range, the STC threshold profile being optimized for land-type target detection, and the mixing ratio is determined based on the output stream from the STC processing.

In one form, the land map filter comprises a two-dimensional low pass filter that is configured to low pass filter the original radar video stream in both azimuth and range.

In one embodiment, the land map filter comprises a two stage low pass filter comprising firstly an azimuth filter configured to low pass filter the radar video stream in azimuth followed by a range filter configured to low pass filter the azimuth filtered stream from the azimuth filter in range to generate the final land map filtered radar video stream.

In one form, the land map filter further comprises a comparator between the azimuth filter and range filter, the comparator being configured to select the minimum value of the original radar video stream and the azimuth filtered stream as input into the range filter.

In one form, the azimuth filter is a median filter. In one form, the width of the sliding window of the median filter is at approximately 4 times the number of azimuth samples within the −3 dB beam width of the radar antenna from which the radar video stream was obtained.

In one form, the range filter is an averaging filter. In one form, the width of the sliding window of the averaging filter is at least 4 times the number of range samples in the −3 dB beam width of the radar antenna from which the radar video stream was obtained.

In a fourth aspect, the invention broadly consists in a method of beam sharpening a radar video stream of echo return intensities, sampled in range and azimuth, comprising: receiving the radar video stream; applying a selectively variable level of beam sharpening to the radar video stream based on a land map generated from the radar video stream; and outputting a land map dependent beam sharpened radar video stream.

In one form, applying a selectively variable level of beam sharpening to the radar video stream comprises selectively suppressing the level of beam sharpening applied relative to a maximum limit of suppression based on the land map data associated with the sample of radar video stream being processed. In one form, the method comprises applying a higher level of beam sharpening suppression to samples corresponding to land-type targets relative to non-land-type targets.

In one form, applying a selectively variable level of beam sharpening to the radar video stream based on a land map comprises: beam sharpening the original radar video stream to generate a beam sharpened radar video stream; determining the land map data for the current sample of the radar video stream being processed; determining a variable mixing ratio for blending the original radar video stream with the beam sharpened radar video stream, the variable mixing ratio being a function of the land map data associated with the current sample being processed; and mixing the original radar video stream with the beam sharpened radar video stream according to the mixing ratio to generate the output land map dependent beam sharpened radar video stream.

In one form, determining the land map data for the current sample of the radar video stream being processed comprises land map filtering the original radar video stream to generate a stream of land map data. In one form, land map filtering the original radar video stream comprises low pass filtering the radar video stream in azimuth and range.

In one form, the low pass filtering of the land map filtering comprises firstly low pass filtering the radar video stream in azimuth with an azimuth filter followed by low pass filtering the azimuth filtered stream in range with a range filter. In one form, the low pass filtering further comprises selecting the minimum of the original radar video stream and azimuth filtered stream for input into the range filter.

In one form, the method further comprises applying land sensitivity time control (STC) processing to the land map data after the land map filtering and determining the variable mixing ratio based on the STC processed land map data.

In one form, the mixing ratio defines the proportion of each of the beam sharpened radar video stream and original radar video stream present in the output land map dependent beam sharpened radar video stream.

In one form, mixing the original radar video stream with the beam sharpened radar video stream based on the mixing ratio comprises: multiplying the original radar video stream by the mixing ratio to generate a first output stream; multiplying the beam sharpened radar video stream by the inverse of the mixing ratio to generate a second output stream; and combining the first and second output streams to generate the output land map dependent beam sharpened radar video stream.

In one form, determining the variable mixing ratio comprises generating the mixing ratio based on a mixing control function. In one form, the mixer control function generates a mixing ratio that varies with the land map data such that the proportion of the beam sharpened radar video stream in the output land map dependent beam sharpened radar video stream is reduced for samples corresponding to land-type targets relative to non-land-type targets.

In one form, the mixing ratio is variable between a first maximum limit representing full beam sharpening suppression applied in which the output land map dependent beam sharpened radar video stream comprises only the original radar video stream and a minimum limit representing nil beam sharpening suppression in which the output land map dependent beam sharpened radar video stream comprises only the beam sharpened radar video stream.

The fourth aspect of the invention may further have any one or more features mentioned in respect of the third aspect of the invention, and vice versa.

In a fifth aspect, the invention broadly consists in a radar beam sharpening system for processing a radar video stream of echo return intensities, sampled in range and azimuth, comprising: a signal processor configured to apply beam sharpening to the radar video stream and to selectively vary the level of beam sharpening applied is a function of range and a land map generated from the radar video stream so as to generate an output selectively beam sharpened radar video stream.

In one form, the signal processor is configured to selectively suppress the level of beam sharpening applied relative to a maximum limit based on the range and land map data associated with the sample of radar video steam being processed.

The level of suppression applied to each sample in the radar video stream may vary from full suppression such that no beam sharpening is present in the output radar video stream, to nil suppression in which full beam sharpening is present in the output radar video stream.

In one form, the signal processor comprises: a beam sharpener that is configured to receive the original radar video stream and generate a beam sharpened radar video stream; and a mixer configured to blend the original radar video steam with the beam sharpened radar video stream based on a variable mixing ratio that is a function of the range and land map generated from the original radar video stream so as to generate the output selectively beam sharpened radar video stream.

In one form, the mixing ratio defines the proportions of each of the original radar video stream and beam sharpened radar video stream present in the output selectively beam sharpened radar video stream.

In one form, the mixer comprises: a mixer control function that is configured to determine the range of the sample of the original radar video stream being processed and to generate land map data for the sample of the original radar video stream being processed, and to generate the variable mixing ratio based on that range and land map data; a first multiplier configured to receive the original radar video stream and multiply that stream by the mixing ratio to generate a first multiplier output stream; a second multiplier configured to receive the beam sharpened radar video stream and multiply that stream by the inverse of the mixing ratio to generate a second multiplier output stream; and an adder configured to combine the first and second output streams from the multipliers to generate the output selectively beam sharpened radar video stream.

In one embodiment, the mixer control function comprises: a range-dependent beam sharpening mixer control function sub-system in accordance with the first aspect of the invention that is configured to generate a first mixing ratio based on range for the current sample of the radar video stream being processed; a land map dependent beam sharpening mixer control function sub-system in accordance with the third aspect of the invention that is configured to generate a second mixing ratio based on the land map data corresponding the current sample of the radar video stream being processed; and a mixer output function that is configured to generate a final mixing ratio to control the mixer based on the first and second mixing ratios.

In one form, the mixer output function may be a comparator that is configured to select the maximum of the first and second mixing ratios as the final mixing ratio. In another form, the mixer output function may be an averagor that is configured to output the average of the first and second mixing ratios as the final mixing ratio.

In one form, the mixing ratio is variable between a first maximum limit representing full beam sharpening suppression applied in which the output selectively beam sharpened radar video stream comprises only the original radar video stream and a minimum limit representing nil beam sharpening suppression in which the output selectively beam sharpened radar video stream comprises only the beam sharpened radar video stream.

The fifth aspect of the invention may have any one or more features mentioned in respect of the first and third aspects of the invention.

In a sixth aspect, the invention broadly consists in a method of beam sharpening a radar video stream of echo return intensities, sampled in range and azimuth, comprising: receiving the radar video stream; applying a selectively variable level of beam sharpening to the radar video stream based on the range and a land map generated from the radar video stream; and outputting a selectively sharpened radar video stream.

In one form, applying a selectively variable level of beam sharpening to the radar video stream comprises selectively suppressing the level of beam sharpening applied relative to a maximum limit of suppression based on the range and land map data associated with the sample of radar video stream being processed.

In one form, applying a selectively variable level of beam sharpening to the radar video stream comprises: beam sharpening the original radar video stream to generate a beam sharpened radar video stream; determining the range of the current sample of the radar video stream being processed; determining the land map data for the current sample of the radar video stream being processed; determining a variable mixing ratio for blending the original radar video stream with the beam sharpened radar video stream, the variable mixing ratio being a function of the range and land map data associated with the current sample being processed; and mixing the original radar video stream with the beam sharpened radar video stream according to the mixing ratio to generate the output selectively beam sharpened radar video stream.

In one form, determining a variable mixing ratio for blending the original radar stream with the beam sharpened radar video stream comprises: determining a first mixing ratio based on the range of the current sample of the radar video stream being processed; determining a second mixing ratio based on the land map data associated with the current sample of the radar video stream being processed; and determining a final mixing ratio based on the first and second mixing ratios.

In one form, determining the first mixing ratio based on range is in accordance with the second aspect of the invention.

In one form, determining the second mixing ratio based on the land map data is in accordance with the fourth aspect of the invention.

In one form, determining the final mixing ratio comprises selecting the maximum of the first and second mixing ratios as the final mixing ratio. In another form, determining the final mixing ratio comprises using the average of the first and second mixing ratios as the final mixing ratio.

In one form, the mixing ratio defines the proportion of each of the beam sharpened radar video stream and original radar video stream present in the output selectively beam sharpened radar video stream.

In one form, mixing the original radar video stream with the beam sharpened radar video stream based on the mixing ratio comprises: multiplying the original radar video stream by the final mixing ratio to generate a first output stream; multiplying the beam sharpened radar video stream by the inverse of the final mixing ratio to generate a second output stream; and combining the first and second output streams to generate the output selectively beam sharpened radar video stream.

In one form, the mixing ratio is variable between a first maximum limit representing full beam sharpening suppression applied in which the output selectively beam sharpened radar video stream comprises only the original radar video stream and a minimum limit representing nil beam sharpening suppression in which the output selectively beam sharpened radar video stream comprises only the beam sharpened radar video stream.

The sixth aspect of the invention may further have any one or more features mentioned in respect of the second and fourth aspects of the invention.

The term "range" as used in this specification and claims, unless the context suggests otherwise, is intended to mean in the context of a sample of the echo intensity radar video stream either the actual physical range to the target associated with the sample or the range sample number for the radar, or any equivalent range reference.

The phrase "mixing ratio" as used in this specification and claims, unless the context suggests otherwise, is intended to mean any number, value or indicator of a proportional mix between two signals, whether expressed or processed in the form of a percentage ratio or decimal fraction or otherwise, and where the mixing ratio is 10% or 0.1 for example, the phrase "inverse of the mixing ratio" is intended to mean 90% or 0.9, i.e. the remaining proportion of the whole.

The phrase "land map" as used in this specification and claims, unless the context suggests otherwise, is intended to refer to a processed or filtered version of the original radar video stream that identifies range and/or azimuth extensive targets such as land-type targets in a radar context, whether land or man-made structures, as compared with point targets, such as boats, which are suppressed from the land map data.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 10c shows a PPI image of a land map generated from the real radar data of FIG. 10a;

DETAILED DESCRIPTION OF PREFERRED EMBODIMENTS

Overview

This invention relates to systems and methods for selectively reducing or reducing beam sharpening within the radar image (e.g. PPI) based on signal processing of the radar video stream. The radar video stream is generated by a rotational radar antenna scanner, such as in marine radar systems for example, although not exclusively. The methods and systems may be applied to any radar systems, and particularly small form factor radar systems. By way of example, the radar video stream may be produced by Frequency Modulated Continuous Wave (FMCW) radar technology or pulse radar technology, or any other radar technology, with digital or analogue processing, or a combination.

The selective reduction of beam sharpening is provided in either or both of the following ways: range selective beam sharpening and/or land map selective beam sharpening. Range selective beam sharpening comprises reducing or suppressing the beam sharpening of the radar data on orange dependent, azimuth independent basis. Typically, beam sharpening is highly reduced at short range, progressing to no reduction in beam sharpening at long range. This will be referred to as 'range blending'. Land map selective range beam sharpening comprises reducing beam sharpening of the radar data for targets that are extensive in azimuth and/or range, i.e. land-type targets. This will be referred to as 'land mapping'. Each of these techniques will be described independently and in combination below.

The methods and systems may be implemented in software or hardware or a combination of these. The systems may be implemented on any hardware architectural electronic system having a programmable processor and memory for carrying the various data and signal processing, including systems having a computer processor, digital signal processor, microcontroller or any other programmable device, as will be appreciated by those skilled in digital radar technology.

Range Selective Beam Sharpening (Range Blending)

Figure 2:
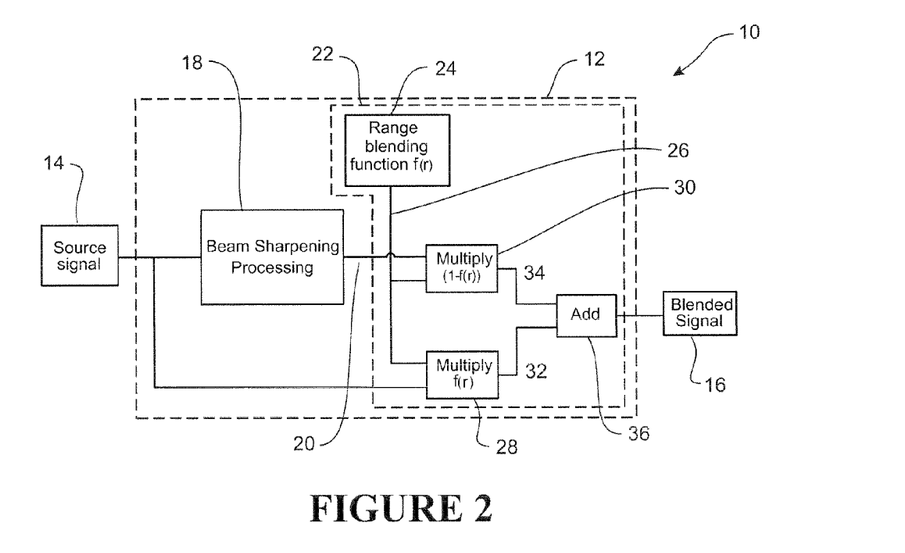
FIG. 2 shows a schematic block diagram of a range selective radar beam sharpening system in accordance with an embodiment of the invention.

Referring to FIG. 2, an embodiment of the range selective beam sharpening system 10 will be explained. The system 10 comprises a signal processor 12 that is configured to receive the source signal 14 from the radar, such as a digital video radar stream, representing echo return intensities sampled in azimuth and range. It will be appreciated that any other form of radar source signal could also be processed, whether analogue or digital. The processor 12 is configured to apply a level of beam sharpening the original radar video stream 14, the level of beam sharpening being range dependent so as to generate an output range-dependent beam sharpened radar video stream as shown at 16. In this embodiment, the output stream 16 is a blended signal of the original radar video stream 14 and a beam sharpened radar video stream 20, and the blending ratio or mixing ratio of these two streams varies as a function of range during the processing of each sample in the radar video stream. The embodiment shown is for linear magnitude signals by way of example only, but it will be appreciated that the system may be adapted and applied to logarithmic magnitude signals also. The processing of the incoming radar video stream is on a continuous sample by sample basis.

In this embodiment, the signal processor 12 comprises a beam sharpener module or function 18 that is configured to receive and process the original incoming radar video stream 14 and to generate a beam sharpened radar video stream 20. The beam sharpener may employ any form of beam sharpening processing, such as deconvolution or any other beam sharpening technique for improving azimuthal resolution, and such techniques are well known to those skilled in radar technology. Typically, the beam sharpener 18 is configured to apply range and azimuth independent beam sharpening to the entire radar video stream. The signal processor 12 further comprises a mixer 22 that is configured to mix the beam sharpened radar video stream 20 with the original radar video stream 14 based on a mixing ratio that varies as a functional range so as to generate the output range dependent beam sharpened radar video stream 16 for further processing and display (e.g. PPI) as is known to those skilled in radar technology.

In this embodiment, the mixer is configured to vary the mixing ratio based on the range of the current sample of the radar video stream being processed in accordance with a mixing control function 24. The mixing control function in this embodiment generates a mixing ratio in the form of a percentage ratio or decimal fraction that is output as a mixing control signal 26 to a mixing circuit. In this embodiment, the mixing ratio may vary in a range from a maximum limit (representing full beam sharpening suppression) which creates an output range-dependent beam sharpened radar video stream 16 that comprises only the original radar video stream 14 and a minimum limit (representing no beam sharpening suppression) which generates an output range-dependent beam sharpened radar video stream 16 comprising only the beam sharpened radar video stream 20. Mixing ratios between the maximum and minimum limit represent blends or mixes of the signals 14,20 in varying proportions to generate the output signal 16.

Figure 3:
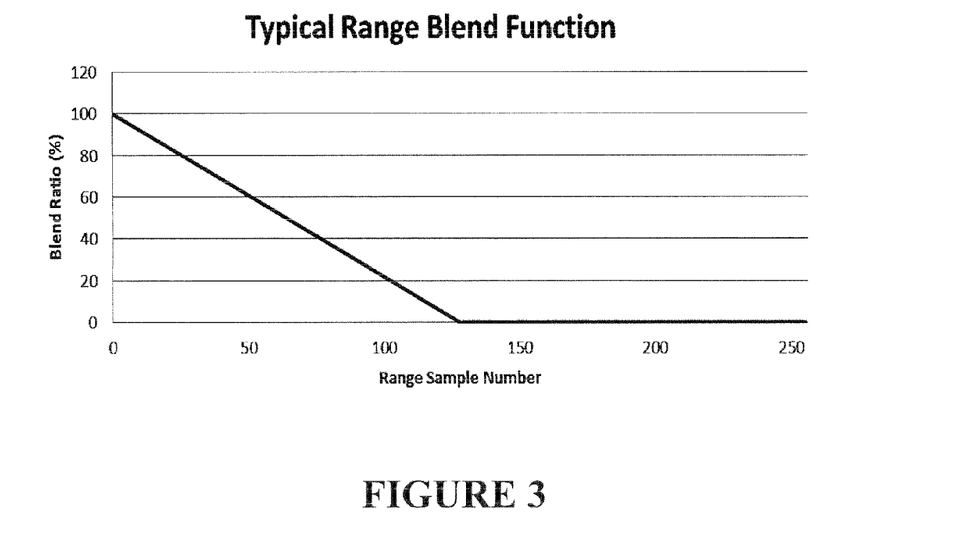
FIG. 3 shows a plot of an example of a mixing control function employed in the range selective beam sharpening system of FIG. 2.

As mentioned above, the mixing control function 24 generates a mixing control signal 26 representing the desired mixing ratio for controlling a mixing circuit to generate the desired blended output signal 16. The mixing control function, which may be referred to as a 'range blending function' f(r) where r corresponds to range, may be provided with a predetermined or preconfigured mixing control function or alternatively may be manually manipulable or controllable via a user input to vary the control function as desired for different radar applications. Referring to FIG. 3, by way of example a typical range blending function is shown with the mixing ratio on the vertical axis and the range sample number of the incoming radar video stream on the horizontal axis. As shown, a typical range blending function is configured to generate a mixing ratio that applies more beam sharpening suppression at closer ranges and reduced or negligible beam sharpening suppression at longer ranges. In the range blending function shown, a mixing ratio of 100% represents the maximum suppression with the blended signal comprising only the unsharpened original video radar stream and a mixing ratio of 0% represents the minimum suppression with the blended output signal comprising only the beam sharpened radar video stream. In the range blending function shown in FIG. 3, maximum beam sharpening suppression is applied at zero range and this progressively and linearly reduces to zero beam sharpening suppression at a range sample number of 125 which is then maintained for the reminder of the longer range samples. It will be appreciated that the range blending function may be modified in profile for different applications and the plot in FIG. 3 is provided by way of example only.

The range blending function is primarily intended to minimize the geometric distortion caused by the PPI but a secondary consideration is to minimize target breakup at extremely short ranges for FMCW applications. Typically a PPI will display a fixed number of radar range samples between zero and a maximum displayable range. The radar range samples have a relationship to a physical range, i.e. meters per sample and this will vary depending on the selected instrument range within a radar and any over scan that might be applied. As geometric distortion caused by the PPI is directly and statically proportional to range samples, it is simpler to consider the range blending function in terms of radar range samples rather than physical range. In practice, the extent of the correction in range possible will be proportional to the beam sharpening ratio (typically 2:1). In practice, the range and function may be made dependent on instrumented range setting, beam sharpening user control setting and/or use modes in line with the optimization goals of the radar product.

Reverting to FIG. 2, the mixing circuit in this embodiment comprises a first multiplier 28 that is configured to receive the original video radar stream 14 and multiply that by the mixing ratio as determined by the mixing control signal 26 from the mixing ratio control function 24 and generate a first multiplier output signal 32. The mixing circuit also comprises a second multiplier 30 that is configured to receive the beam sharpened radar video stream 20 and multiply that by the inverse of the mixing ratio as determined by the mixing control signal 26 from the mixing control function 24 to generate a second multiplier output signal 34. The reference to inverse of the mixing ratio refers to the remainder percentage or remainder decimal fraction of the mixing ratio relative to the whole. For example, if the mixing ratio is 10% or 0.1 for the first multiplier (representing only 10% beam sharpening suppression) then the inverse of the mixing ratio for the second multiplier is 90% or 0.9. The mixing circuit is completed with an adder 36 that is configured to combine the first and second multiplier output signals 32, 34 from the multiplies 28,30 to generate the output range-dependent beam sharpened radar video stream 16 for subsequent display or further signal processing as known in radar technology. It will be appreciated that any other form of mixing circuit could be used to combine the original and beam sharpened signals 14,20 if desired.

EXAMPLE 1

Simulated Radar Data

Figure 4A:
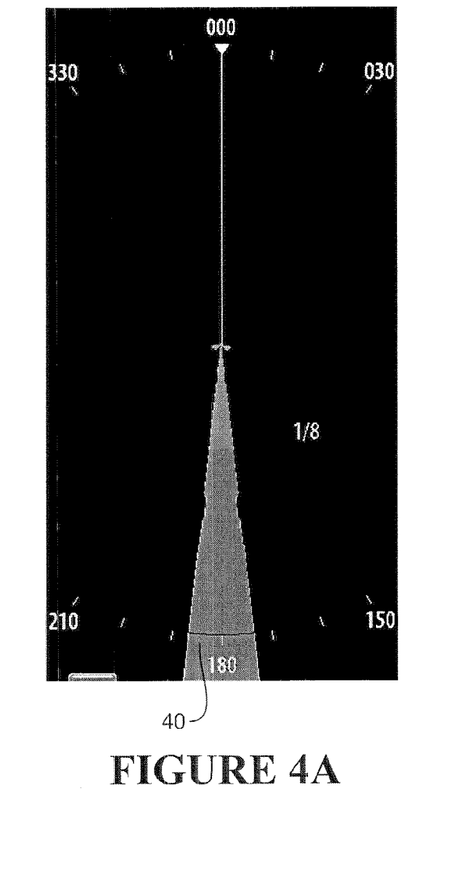
FIG. 4a shows a PPI image of simulated radar data for a range extensive target at azimuth 180° that has minimal width in azimuth for an unsharpened radar video stream.
Figure 4B:
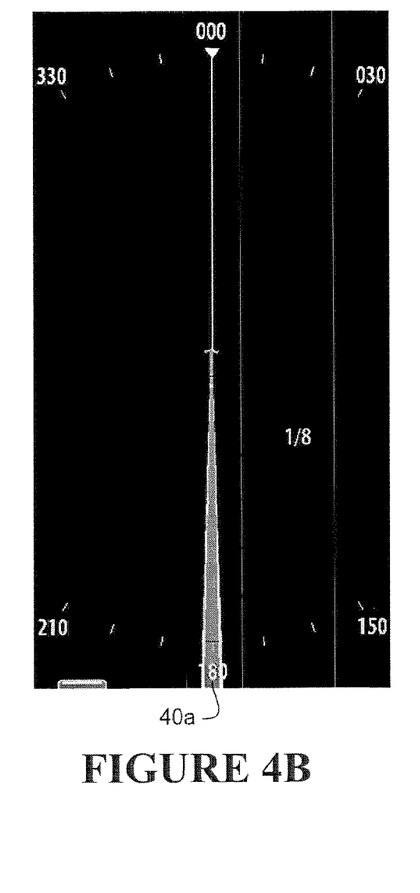
FIG. 4b shows a PPI image of FIG. 4a but with the radar video stream with beam sharpening applied.
Figure 4C:
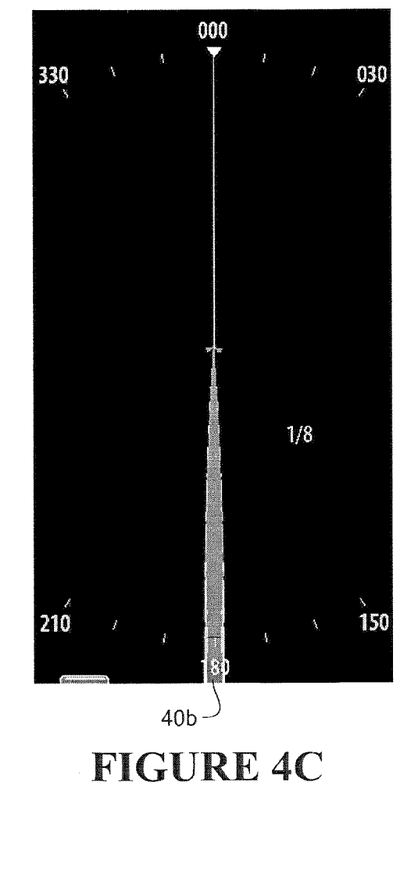
FIG. 4c shows a PPI image of FIG. 4a with range selective beam sharpening applied to the radar video stream in accordance with an embodiment of the invention.

Referring to FIGS. 4a-4c, the effect of the range selective beam sharpening system 10 described above will be demonstrated for a simulated portion of a radar video stream. FIG. 4a shows the original radar video stream showing a target 40 on the PPI image from an original radar video stream for a simulated range extensive target at 180° azimuth and which has minimal width in azimuth. FIG. 4b shows the same target 40a on the PPI image once the original video radar stream signal has been subjected to conventional beam sharpening signal processing. As shown in FIG. 4b, beam sharpening causes the target 40a displayed, compared to the original target 40 depicted in FIG. 4a, to become smaller in the azimuth direction at all ranges. While the beam sharpening reduces the visual distortion, the range selective beam sharpening system can be employed to further reduce the distortion by blending the original radar video signal 14 with the beam sharpening signal 20 in a range dependent manner to generate the target 40b displayed in the PPI image of FIG. 4c.

EXAMPLE 2

Real Radar Data

Figure 5A:
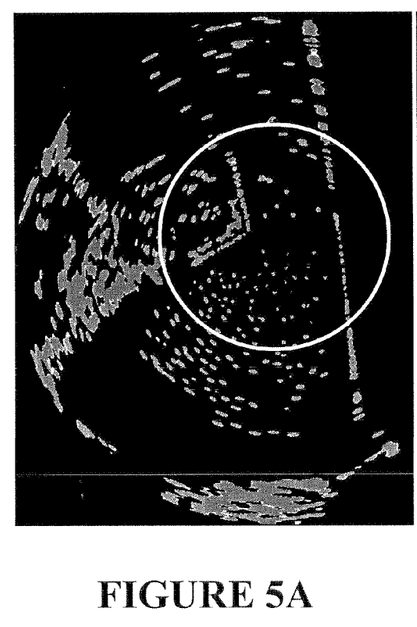
FIGS. 5a and 5b show PPI images of boats in a marina from real radar data with a radar instrumented range of 1/4 nm with conventional beam sharpening (FIG. 5a) and with range selective beam sharpening applied in accordance with an embodiment of the invention (FIG. 5b)
Figure 5B:
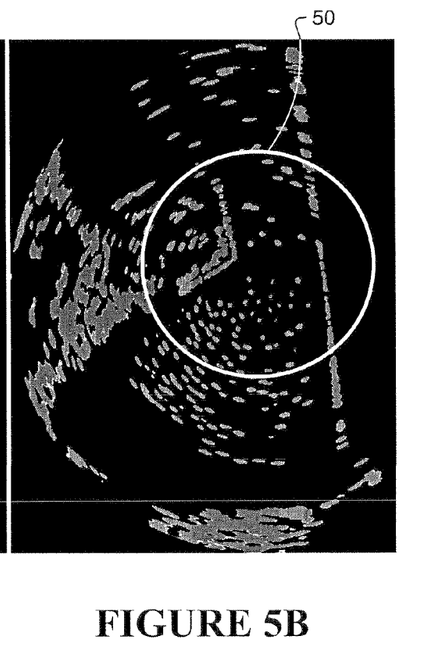
Figure 6A:
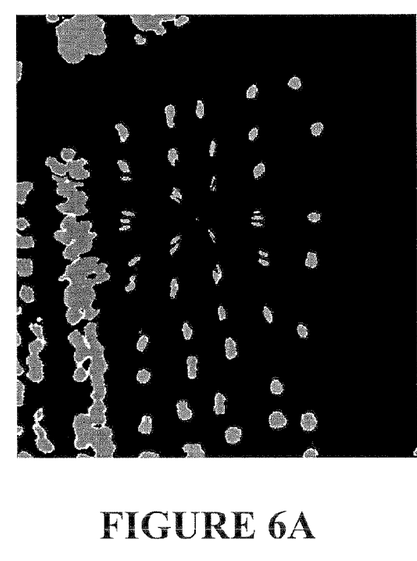
FIGS. 6a and 6b show PPI images of moored sailboats in a marina from real radar data at a radar instrumented range of 100 m with conventional beam sharpening applied (FIG. 6a) and with range selective beam sharpening applied in accordance with an embodiment of the invention (FIG. 6b)
Figure 6B:
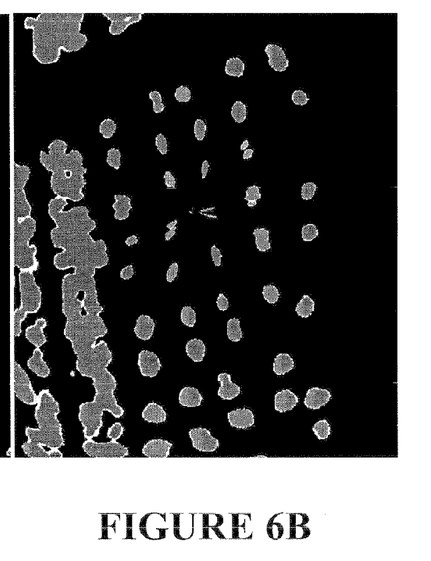

Referring to FIGS. 5a and 5b, these depict the PPI images of real radar data obtained with boats in a marina with a radar instrumented range of ¼ nm. FIG. 5a shows the conventional beam sharpened radar image. FIG. 5b shows the radar image with the range-selective beam sharpening processing applied, particularly with suppression of the beam sharpening in the area indicated at 50. Comparing FIGS. 5b to 5a, it can be seen that FIG. 5b shows improved target visibility, image balance and reduced breakup of targets at very short ranges. This is also apparent in FIGS. 6a and 6b which show radar images of board sailboats in the marina with the radar instrumented range of 100 meters. FIG. 6a shows the conventional beam sharpened radar image and FIG. 6b shows the range selective being sharpened image (i.e. with range blending on).

Land Map Selective Beam Sharpening (Land Mapping)

Referring to FIGS. 7-10d, the land map selective beam sharpening system 100 will be explained. For radar marine applications, detail for targets on water and the coastline is more valuable than detail within land areas for general navigation. Reducing detail within land areas also makes it easier to distinguish water areas from land. The objective of the land map selective beam sharpening system is to reduce or suppress beam sharpening for targets that are extensive in azimuth and/or range such as land-type areas, whether actual land or large fixed man-made structures such as ports, bridges or similar.

Figure 7:
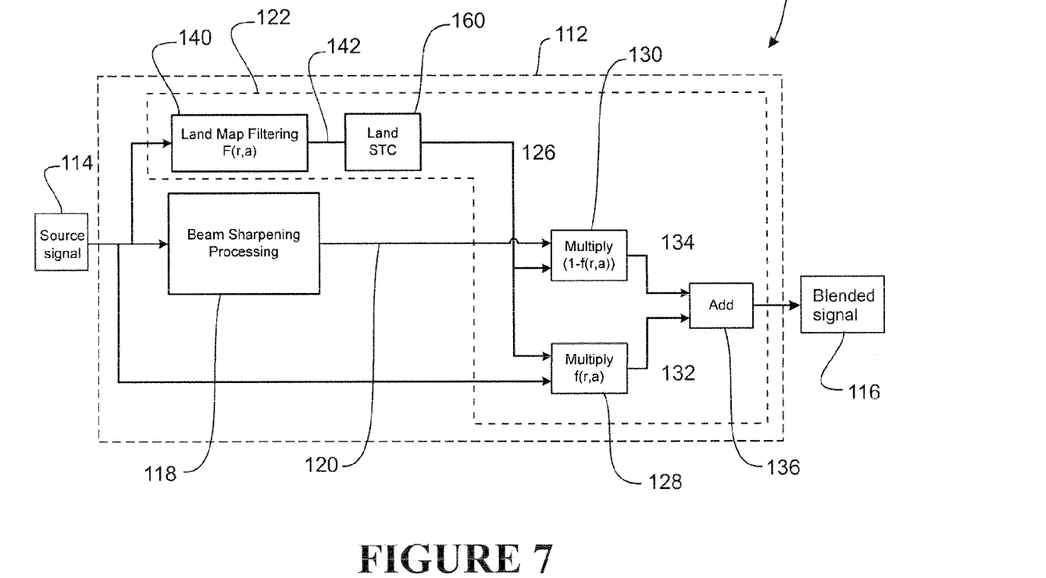
FIG. 7 is a schematic block diagram of a land map selective beam sharpening system in accordance with an embodiment of the invention.

In the land map selective range blending system 100, the original radar video stream 114 is received by a signal processor 112 that is configured to process the incoming stream 114 on a sample by sample basis to apply a level of beam sharpening to the radar video stream, the level of beam sharpening applied being dependent in range and azimuth on a land map generated from the radar video stream so as to generate an output land map dependent beam sharpened radar video stream 116.

In this embodiment, the signal processor 112 comprises a beam sharpener 118 that is configured to receive the original radar video stream 114 and apply beam sharpening to generate a beam sharpened radar video stream 120 as with the case in range selective beam sharpening system 10. The signal processor 112 also comprises a mixer 122 that is configured to blend the beam sharpened radar video stream 120 with the original radar video stream 114 based on a mixing ratio that is dependent on a land map of the radar video stream.

In this embodiment, the mixer 122 comprises a mixer control function that generates a mixing ratio that is dependent in range and azimuth on the land map and the mixing ratio is represented by a mixing control signal 126 that controls a mixing circuit similar to that described in the range selective beam sharpening system 10.

The mixing ratio again extends between a maximum limit representing an output land map dependent beam sharpened radar video stream 116 comprising only the original radar video stream 114 (i.e. full beam sharpening suppression) and a minimum limit where the output land map dependent beam sharpened radar video stream 116 comprises only the beam sharpened radar video stream 120 (i.e. nil or minimum beam sharpening suppression).

The mixing control function is typically configured to increase the mixing ratio toward the maximum limit of suppression for radar video stream samples corresponding to land-type targets that are extensive in azimuth and/or range so as to apply maximum beam sharpening suppression in land-type areas relative to non-land type areas where minimum or nil beam sharpening suppression is applied.

The mixer control function in this embodiment comprises a land map generator that is configured to process the incoming radar video stream 114 and generate land map data identifying the land-type areas. The land map generator comprises a land map filter 140 that is configured to filter the original radar video stream 114 in range and azimuth to generate a land map filtered radar video stream 142 from which the mixing ratio and corresponding mixing ratio control signal 126 is determined. The objective of the land map filter 140 is to heavily suppress point targets while not suppressing range and/or azimuth extensive targets. The land map filtered radar video stream 142 is effectively a low pass filtered version of the original radar video stream 114.

Figure 8:
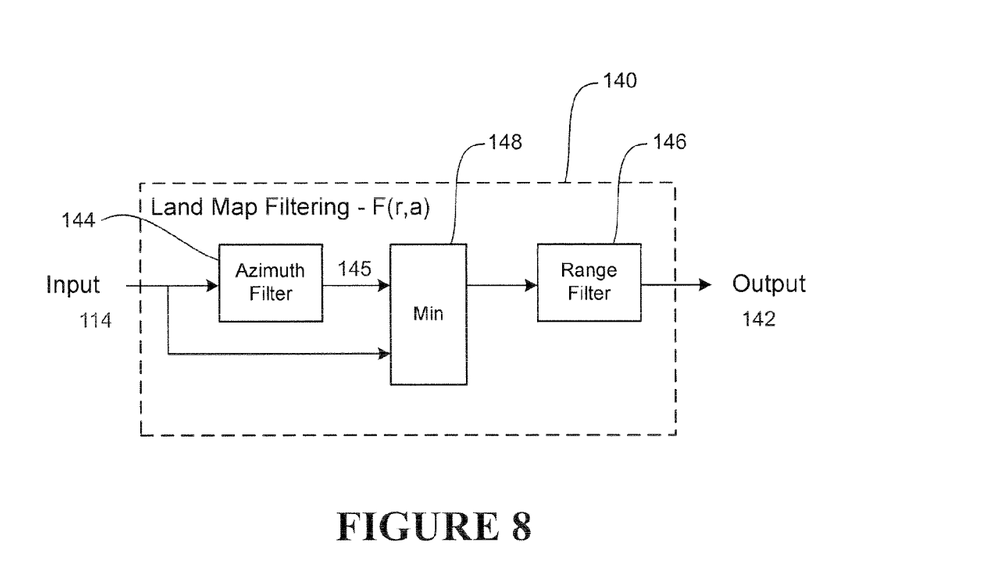
FIG. 8 is a schematic block diagram of a land map filter of the system of FIG. 7 in accordance with an embodiment of the invention.

Referring to FIG. 8, an example of the land map filter 140 will be described. In this embodiment, the land map filter comprises a two-dimensional low pass filter that is configured to low pass filter the radar video stream in both azimuth and range. The land map filter has the following design objectives:

1. high rejection of isolated point targets
2. minimal loss of extensive targets
3. graceful and appropriate rejection as target size transitions from isolated point target to extensive target
4. graceful and appropriate rejection as point target density transitions from widely spaced to a merged cluster
5. accurate tracking of abrupt edges, e.g. man-made land features such as ports A graceful rejection characteristic with the target size (in samples) and density is important in making the final image appear 'natural'. In the preferred embodiment shown in FIG.

8, the land map filter comprises a two-stage low pass filter comprising firstly an azimuth filter 144 that is configured to low pass filter the radar video stream in azimuth and a second range filter 146 that is configured to low pass filter the azimuth filtered signal 145 from the azimuth filter in range to generate the land map filtered signal 142. Additionally, the land map filter 140 further comprises a comparator 148 between the azimuth filter and range filter, the comparator being configured to select a minimum value of the incoming radar video stream and the output filtered signal 145 from the azimuth filter as input into the range filter 146.

Figure 9A:
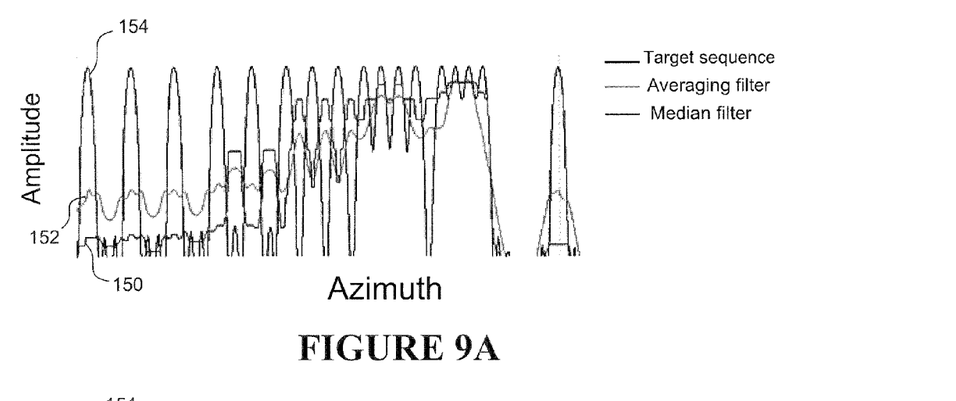
FIG. 9a shows a plot of low pass filtering of a target sequence in azimuth comparing the use of an averaging filter and a median filter.
Figure 9B:
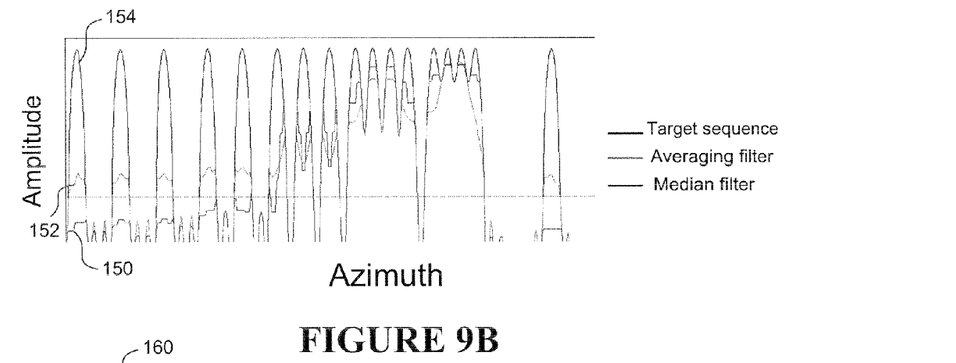
FIG. 9b shows a plot of low pass filtering of a target sequence in azimuth comparing the use of an averaging filter and a median filter and demonstrating the use of a comparator at the output of the filter configured to select the minimum of the filter output or original input signal.

In the preferred embodiment, the azimuth filter 144 is a median filter, although it will be appreciated that any other low pass filter may be used, including an averaging filter if desired. The preferred width of the window of the median filter is approximately 4 times the number of samples within the −3 dB beam width of the radar antenna. The number of samples within the antenna beam width, which is referred to as the dwell count, may be dependent on the radar's mode of operation and any prior interpolation or decimation processes. If we assume a dwell count of 7, then the width of the azimuth filter for land mapping would need to be approximately 28, but a filter width of 31 may be used for symmetry. FIG. 9a shows a comparison of the difference between a median filter output 150 and an averaging filter output 152 for an input target sequence 154 by way of example. The simulated target sequence (in azimuth) of point targets begins with wide spacing to the left and progresses to targets being completely merged and on the right an isolated point target. The effect of the sliding averaging filter 152 (with unity weighting) and a sliding median filter 150, both with window width 31 is shown. A 'bridging' affect occurs at certain target spacing. To eliminate this 'bridging' effect, the comparator 148 in the low pass filter 140 is used to select the minimum between input and output of the azimuth filter 144 as previously explained. The result of additional comparator 148 is apparent in FIG. 9b. It can be seen that the median filter provides superior isolated point target rejection and better edge preservation of merged/extensive target. A narrow smoothing filter may be applied to reduce the artifacts of the non-linear processing if desired.

Figure 9C:
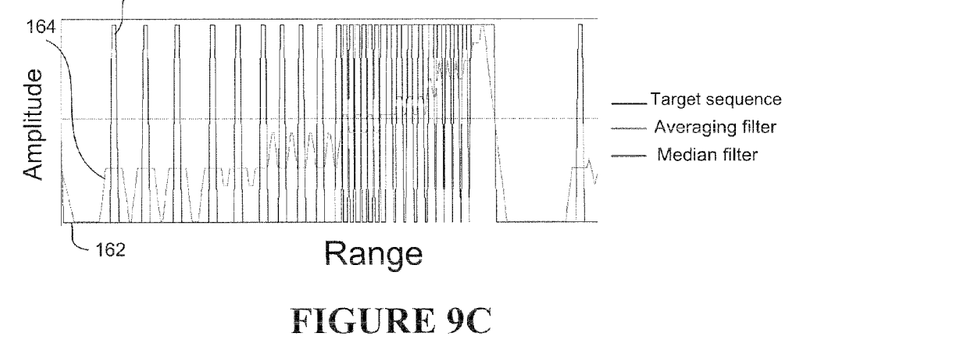
FIG. 9c shows a plot of low pass filtering of a target sequence in range comparing the use of an averaging filter and a median filter.

Filtering in range is conceptually similar to that in the azimuth direction. In the preferred embodiment, the range filter 146 is an averaging filter. In range, the length (in samples) of a point target is determined by the range resolution of the radar. The range resolution of a pulse radar is primarily determined by the transmit pulse length and in FMCW the sweep width and FFT resolution. In small radars, dynamic range and resolution in range is typically much greater than that in azimuth. This results in fewer samples within −3 dB width of a point target. To provide a similar level of point rejection as that azimuth, in the preferred embodiment an averaging filter having a window that is 4 times the −3 dB width is employed. Assuming three samples within the −3 dB points, the preferred range filter width is approximately 12, but 11 may be used to maintain symmetry for example. FIG. 9c shows a target sequence 160 in range as equivalent to FIG. 9a and with a comparison of a median filter applied 162 and an averaging filter applied 164. The averaging filter 164 exhibits a much more graceful rejection characteristic as the target intensity increases. The extremely steep sides on targets in range make the median filter 162 intensity versus rejection characteristic very abrupt.

In the preferred embodiment, the azimuth filtering (median filtering) is done prior to the range filtering (averaging filtering). A median filter has exceptional outlier data rejection, often caused by interference from other radars, whereas a simple averaging filter is not as good in this respect.

The filter parameters may be made dependent on instrumented range settings. Point target returned energy decays is a function of range to the fourth power, whereas horizontal beam filling targets such as land decay to the third power i.e. point target returns diminish more quickly than land targets with increasing range. Therefore, less point target rejection may be required at longer ranges and filter parameters may be adjusted to take advantage of this fact.

While the preferred low pass filtering regime has been described above, it will be appreciated that a multiple of other low pass filter types whether median, averaging or otherwise could be applied to generate the land map data signal 142. Additionally, other configurations of azimuth filter and range filtering could be included, including direct two-dimensional filters, parallel configurations or any other suitable filtering configurations.

Reverting to FIG. 7, the land map generator of the mixer control function in this embodiment further comprises a land sensitivity time control (STC) function 160 that is configured to apply STC processing to the land map filtered radar video stream 142 based on an STC threshold profile that is optimized for land detection. The purpose of land STC 160 is to set an appropriate threshold, above which beam sharpening is reduced proportional to the amplitude of the land filtering output. Typically, an STC profile is subtracted (in the case of logarithmic signals) from the input signal that makes all unwanted signals become negative and wanted signals positive, i.e. the threshold is made zero across range. This threshold is commonly referred to as the black level.

A reasonable assumption is made that land-type targets will usually fill the horizontal beamwidth. Targets of this type have a signal return that decays as a third power of range and it follows that the STC profile will have the same characteristic. This profile also creates a black level that represents constant surface reflectivity in range with units of $dBm^2/m^2$. A target with low reflectivity, such as a gently sloping, forest covered land mass (0.05-0.1 $dBm^2/m^2$) would typically be used as a baseline threshold but it may be adjusted to better suit certain target scenarios, such as a major port.

After the STC function processing 160, a mixing control signal 126 representing the desired mixing ratio is generated and is dependent on the land filtered and STC processed signal output from the mixer control function. In the preferred embodiment, the mixer control function generates a mixing ratio towards the maximum limit for maximum beam sharpening suppression for samples of the radar video stream corresponding to land areas or land-type areas as determined by the land map data stream output from the land map filtering and STC processing. Typically the level of suppression relative to the maximum limit is proportional to the amplitude of the signal output from the land map filtering and STC processing. For non-land type targets, the output signal from the land map filtering and land STC will typically be zero causing a mixing ratio at the minimum limit causing no beam sharpening suppression to be applied to such samples in the radar video stream.

The mixing circuit employed in the mixer 122 is similar to that described with reference to the range selected beam sharpening system 10. A first multiplier 128 receives the original radar video stream 114 and multiples that by the mixing ratio as determined by the mixing control signal 126 fed into the first multiplier 128 to generate a first multiplier output signal 132. A second multiplier 130 is provided which receives the beam sharpened radar video stream 120 and multiplies that signal by the inverse of the mixing ratio as determined by the mixing ratio signal 126 to generate a second multiplier output signal 134. In this context as described before, if the mixing ratio is a percentage ratio or decimal fraction such as 20% or 0.20, then the inverse of the mixing ratio is intended to refer to 80% or 0.8. An adder 136 is provided at the output of the mixing circuit which is configured to combine the multiplier output signals 132,134 from the first and second multipliers 128, 130 to generate the final land map selective beam sharpened radar video stream 116 representing the land map data.

EXAMPLE 3

Real Radar Data

Figure 10A:
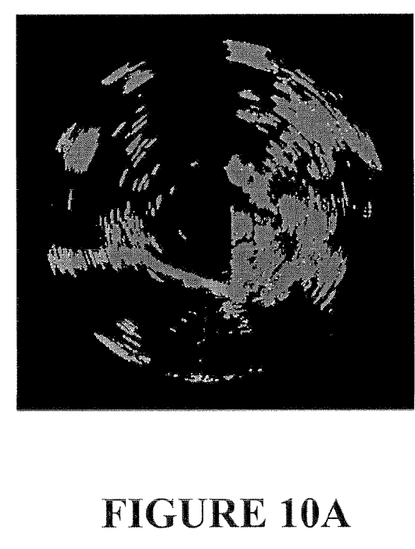
FIG. 10a shows a PPI of real radar data without beam sharpening applied.
Figure 10B:
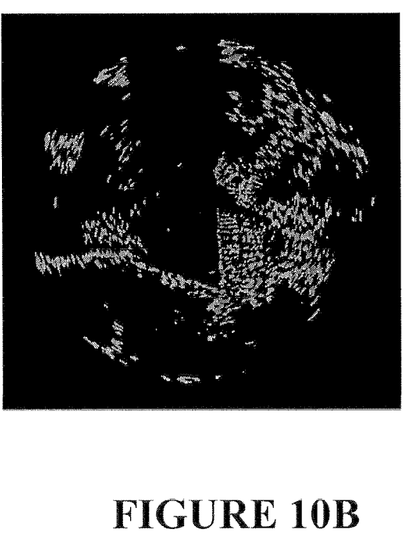
FIG. 10b shows a PPI image of the real radar data of FIG. 10a with beam sharpening applied to the radar data.
Figure 10C:
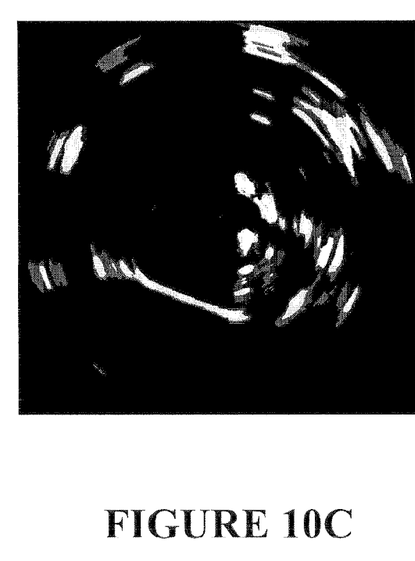
Figure 10D:
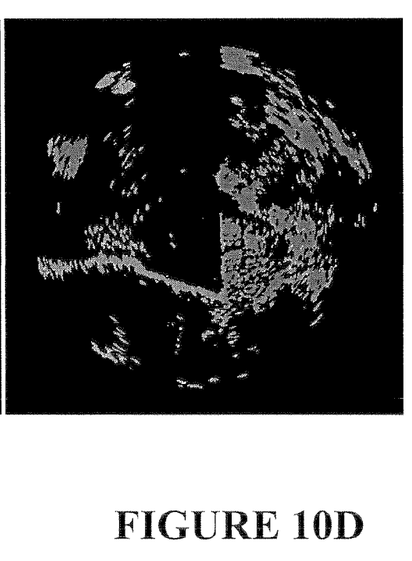
FIG. 10d shows a PPI image of the real radar data of FIG. 10a with land map selective beam sharpening applied in accordance with an embodiment of the invention.

Referring to FIGS. 10a-10d, an example of the land mapping selective beam sharpening system 100 being applied to real radar data will be shown. FIG. 10a represents a PPI image for real radar data of a complex harbour scenario with a 4 dB visible aperture. FIG. 10a shows the PPI image from the original radar video stream 114. FIG. 10b shows the PPI image with beam sharpened radar video stream. FIG. 10c shows the land map filtered radar video stream after land map filtering and STC processing, and the resulting PPI image visually represents areas in the PPI image that will be subject to varying levels of beam sharpening suppression. Finally, FIG. 10d shows the resulting PPI image of FIG. 10a when land map selective beam sharpening is applied to the radar video stream. As shown, beam sharpening is significantly suppressed in land-type areas therefore making such areas more discernable and visible for navigation purposes while the beam sharpening is unsuppressed for other point targets that are not range or azimuth extensive.

Combined Range and Land Map Selective Beam Sharpening System

Figure 11:
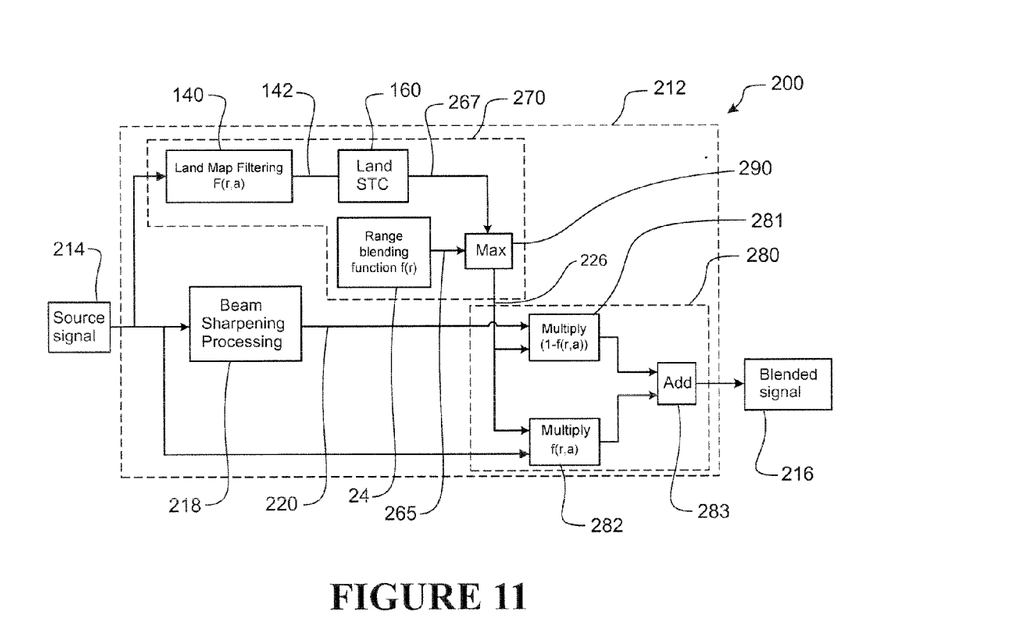
FIG. 11 shows a schematic block diagram of a selective beam sharpening system comprising both range selective beam sharpening and land map selective beam sharpening in accordance with an embodiment of the invention.

Referring to FIG. 11, another embodiment in which a range and land map selective beam sharpening system 200 is provided and which is a combination of the previous systems 10, 100 will be described. Like reference numerals refer to like features and functionality. As will be explained in further detail, the combined system 200 comprises a signal processor 212 that is configured to apply a level of beam sharpening to the incoming radar video stream 214, and where the level of beam sharpening is range and land map dependent as with the previous systems 10, 100. The output selectively beam sharpened radar video stream 216 is again a blended signal of the original radar video stream 214 and the beam sharpened radar video stream 220 from the beam sharpener 218 and where the mixing ratio is determined by the mixer control function.

In this embodiment, the mixer control function 270 comprises both a range blending function 24 as described with reference to the system 10 which generates for each sample of the radar video stream a mixing ratio signal 265 that is dependent on the range sample number. Additionally, the mixer control function comprises a land map generator (land map filtering 140 and land. STC processing 160) that is configured to process the radar video stream 214 and generate a land map mixing ratio signal 267 as described with reference to the system 100. At the output of a mixer control function, a final mixing ratio signal 226 is generated as a function of the range blending mixing ratio signal 265 and the land map mixing ratio signal 267. In this embodiment, a processor 290 is provided in the form of a comparator for selecting the maximum of either signals 265, 267 to represent the final mixing ratio signal 226 to be applied to the mixing circuit 280. However, it will be appreciated that in other embodiments the processor 290 need not necessarily be a maximum comparator and may alternatively be configured to take an average or median of the two signals 265, 267 or apply any other signal processing or function to generate the final mixing ratio signal 226.

In the manner previously described with reference to both systems 10 and 100, the mixing ratio signal 226 is then applied to a mixing circuit 280 comprising two multipliers 281 and 282 and an adder 283 to generate the final range and land map selective beam sharpened output radar video stream 216.

EXAMPLE 4

Real Radar Data

Figure 12A:
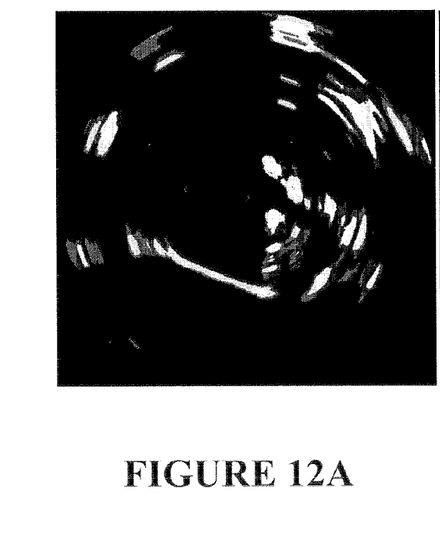
FIG. 12a shows a PPI image of the land map associated with FIGS. 10a and 10c.
Figure 12B:
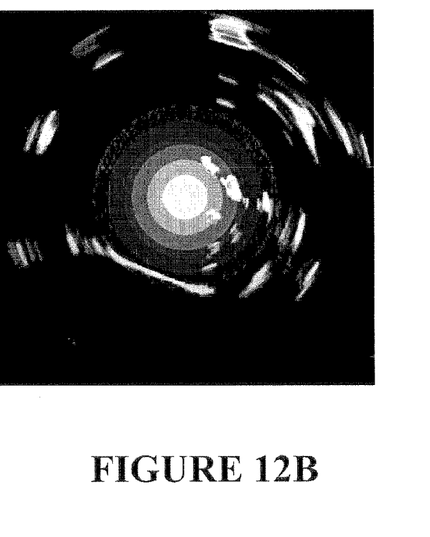
FIG. 12b shows a PPI image of the selective beam sharpening suppression map created by the selective beam sharpening system of FIG. 11.

Referring to FIG. 12a, a land map equivalent to that shown and described with reference to FIG. 10c is shown with the same real radar data. The combined mixing ratio data 226 is depicted in FIG. 12b for the combined range and land map selective beams sharpening system 200. As shown, the range blending suppression of the beam sharpening is dominant for close ranges as represented by the concentric bands of progressively reducing beam sharpening suppression and the remaining beam sharpening suppression is caused by the land map areas at longer ranges. Where the range blending suppression and land mapping suppression overlap, the level of suppression is dictated by the maximum value between the range blending and land mapping, in this embodiment.

The foregoing description of the invention includes preferred forms thereof. Modifications may be made thereto without departing from the scope of the invention as defined by the accompanying claims.

The invention claimed is:

1. A radar beam sharpening system for processing a radar video stream of echo return intensities, sampled in range and azimuth, comprising: a signal processor configured to apply beam sharpening to the radar video stream and to selectively vary the level of beam sharpening applied to samples of the radar video stream based on their respective ranges so as to generate an output range-dependent beam sharpened radar video stream,
    wherein the signal processor is configured to reduce the beam sharpening applied for at least a portion of shorter ranges relative to longer ranges.

2. A radar beam sharpening system according to claim 1 wherein the signal processor is configured to selectively suppress the level of beam sharpening applied relative to a maximum limit of suppression based on the range of the sample of radar video stream being processed.

3. A radar beam sharpening system according to claim 2 wherein the signal processor is configured to apply a higher level of beam sharpening suppression at shorter ranges relative to longer ranges.

4. A radar beam sharpening system according to claim 2 wherein the level of beam sharpening suppression applied to each sample in the radar video stream is selected from a range defined between full suppression in which no beam sharpening is present in the output radar video stream and nil suppression in which full beam sharpening is present in the output radar video stream.

5. A radar beam sharpening system according to claim 1 wherein the signal processor comprises:
    a beam sharpener that is configured to receive and process the original radar video stream and generate a beam sharpened radar video stream; and
    a mixer configured to blend the original radar video stream with the beam sharpened radar video stream based on a variable mixing ratio that is a function of range of the sample of the radar video steam being processed so as to generate the output range-dependent beam sharpened radar video stream, and wherein the mixing ratio defines the proportions of each of the original radar video stream and beam sharpened radar video stream present in the output range-dependent beam sharpened radar video stream.

6. A radar beam sharpening system according to claim 5 wherein the mixer comprises:
   a mixer control function that is configured to determine the range of the sample of the original radar video stream being processed and to generate the variable mixing ratio based on that range;
   a first multiplier configured to receive the original radar video stream and multiply that stream by the mixing ratio to generate a first multiplier output stream;
   a second multiplier configured to receive the beam sharpened radar video stream and multiply that stream by the inverse of the mixing ratio to generate a second multiplier output stream; and
   an adder that is configured to combine the first and second output streams from the multipliers to generate the output range-dependent beam sharpened radar video stream.

7. A radar beam sharpening system according to claim 6 wherein the mixer control function is configured to generate a mixing ratio that varies with range such that the proportion of the beam sharpened radar video stream in the output range-dependent beam sharpened radar video stream is reduced for short ranges relative to longer ranges.

8. A radar beam sharpening system according to claim 6 wherein the mixer control function is configured to generate a variable mixing ratio in a range defined between a first maximum limit representing full beam sharpening suppression applied in which the output range-dependent beam sharpened radar video stream comprises only the original radar video stream and a minimum limit representing nil beam sharpening suppression in which the output range-dependent beam sharpened radar video stream comprises only the beam sharpened radar video stream.

9. A radar beam sharpening system according to claim 1 wherein the signal processor is further configured to selectively vary the level of beam sharpening applied based on a land map generated from the radar video stream.

10. A method of beam sharpening a radar video stream of echo return intensities, sampled in range and azimuth, the method implemented by a programmable signal processor and comprising:
    receiving the radar video stream;
    applying a selectively variable level of beam sharpening to the samples of the radar video stream based on their respective ranges by reducing the beam sharpening applied for at least a portion of shorter ranges relative to longer ranges; and
    outputting a range-dependent beam sharpened radar video stream.

11. A radar beam sharpening system for processing a radar video stream of echo return intensities, sampled in range and azimuth, comprising:
    a signal processor configured to apply beam sharpening to the radar video stream and to selectively vary the level of beam sharpening applied to the samples of the radar video stream based on land map data generated from the radar video stream by a land map generator so as to generate an output land map dependent beam sharpened radar video stream, the land map generator being configured to generate land map data indicative of whether a sample of the radar video stream is a land-type target or non-land type target, and wherein the signal processor is configured to reduce the beam sharpening applied to samples corresponding to land-type targets relative to non-land type targets.

12. A radar beam sharpening system according to claim 11 wherein the signal processor is configured to selectively suppress the level of beam sharpening applied relative to a maximum limit based on the land map data associated with the sample of radar video steam being processed.

13. A radar beam sharpening system according to claim 12 wherein the signal processor is configured to apply a higher level of beam sharpening suppression to samples corresponding to land-type targets relative to non-land-type targets as determined from, the land map data.

14. A radar beam sharpening system according to claim 12 wherein the level of beam sharpening suppression applied to each sample in the radar video stream is selected from a range defined between full suppression in which no beam sharpening is present in the output radar video stream and nil suppression in which full beam sharpening is present in the output radar video stream.

15. A radar beam sharpening system according claim 14 wherein the signal processor is configured to apply nil suppression to samples corresponding to non-land-type targets, and a level of suppression to samples corresponding to land-type targets that increases with the intensity of the land-type targets based on the land map data.

16. A radar beam sharpening system according to claim 11 wherein the signal processor comprises:
    a beam sharpener that is configured to receive the original radar video stream and generate a beam sharpened radar video stream; and
    a mixer configured to blend the original radar video steam with the beam sharpened radar video stream based on a variable mixing ratio that is a function of the land map data generated from the original radar video stream so as to generate the output land map dependent beam sharpened radar video stream, and wherein the mixing ratio defines the proportions of each of the original radar video stream and beam sharpened radar video stream present in the output land map dependent beam sharpened radar video stream.

17. A radar beam sharpening system according to claim 16 wherein the mixer comprises:
    a mixer control function that is configured to generate land map data for the sample of the original radar video stream being processed and to generate the variable mixing ratio based on that land map data;
    a first multiplier configured to receive the original radar video stream and multiply that stream by the mixing ratio to generate a first multiplier output stream;
    a second multiplier configured to receive the beam sharpened radar video stream and multiply that stream by the inverse of the mixing ratio to generate a second multiplier output stream; and
    an adder configured to combine the first and second output streams from the multipliers to generate the output land map dependent beam sharpened radar video stream.

18. A radar beam sharpening system according to claim 17 wherein the mixing control function is configured to generate a mixing ratio that varies with the land map data such that the proportion of the beam sharpened radar video stream in the output land map dependent radar video stream is reduced for samples of the radar video stream corresponding to land-type targets relative to non-land-type targets.

19. A radar beam sharpening system according to claim 18 wherein the mixer control function is configured to generate a variable mixing ratio in a range defined between a first maximum limit representing full beam sharpening suppression applied in which the output land map dependent beam sharpened radar video stream comprises only the original radar video stream and a minimum limit representing nil beam sharpening suppression in which the output land map dependent beam sharpened radar video stream comprises only the beam sharpened radar video stream.

20. A radar beam sharpening system according to claim 19 wherein the mixer control function comprises the land map generator that is configured to generate land map data from the original radar video stream, and wherein the land map generator comprises a land map filter that is configured to low pass filter the original radar video stream in range and azimuth to generate a land map filtered radar video stream and the mixing ratio is dependent on the land map filtered radar video stream.

21. A radar beam sharpening system according to claim 20 wherein the land map generator of the mixer control function further comprises a land sensitivity time control (STC) function following the land map filter that is configured to apply STC processing to the land map filtered radar video stream based on an STC threshold profile that defines an echo return intensity threshold over range, the STC threshold profile being optimized for land-type target detection, and the mixing ratio is determined based on the output stream from the STC processing.

22. A radar beam sharpening system according to claim 20 wherein the land map filter comprises a two stage low pass filter comprising firstly an azimuth filter configured to low pass filter the radar video stream in azimuth followed by a range filter configured to low pass filter the azimuth filtered stream from the azimuth filter in range to generate the final land map filtered radar video stream.

23. A radar beam sharpening system according to claim 22 wherein the land map filter further comprises a comparator between the azimuth filter and range filter, the comparator being configured to select the minimum value of the original radar video stream and the azimuth filtered stream as input into the range filter, and wherein the azimuth filter is a median filter and the range filter is an averaging filter.

24. A radar beam sharpening system according to claim 11 wherein the signal processor is further configured to selectively vary the level of beam sharpening applied based on range.

25. A method of beam sharpening a radar video stream of echo return intensities, sampled in range and azimuth, the method implemented by a programmable signal processor comprising:
  receiving the radar video stream;
  applying a selectively variable level of beam sharpening to the samples of the radar video stream based on land map data generated from the radar video stream by a land map generator that is configured to generate land map data indicative of whether a sample of the radar video stream is a land-type target or non-land type target, and reducing the beam sharpening applied to samples corresponding to land-type targets relative to non-land type targets; and
  outputting a land map dependent beam sharpened radar video stream.

* * * * *